UNITED STATES PATENT OFFICE.

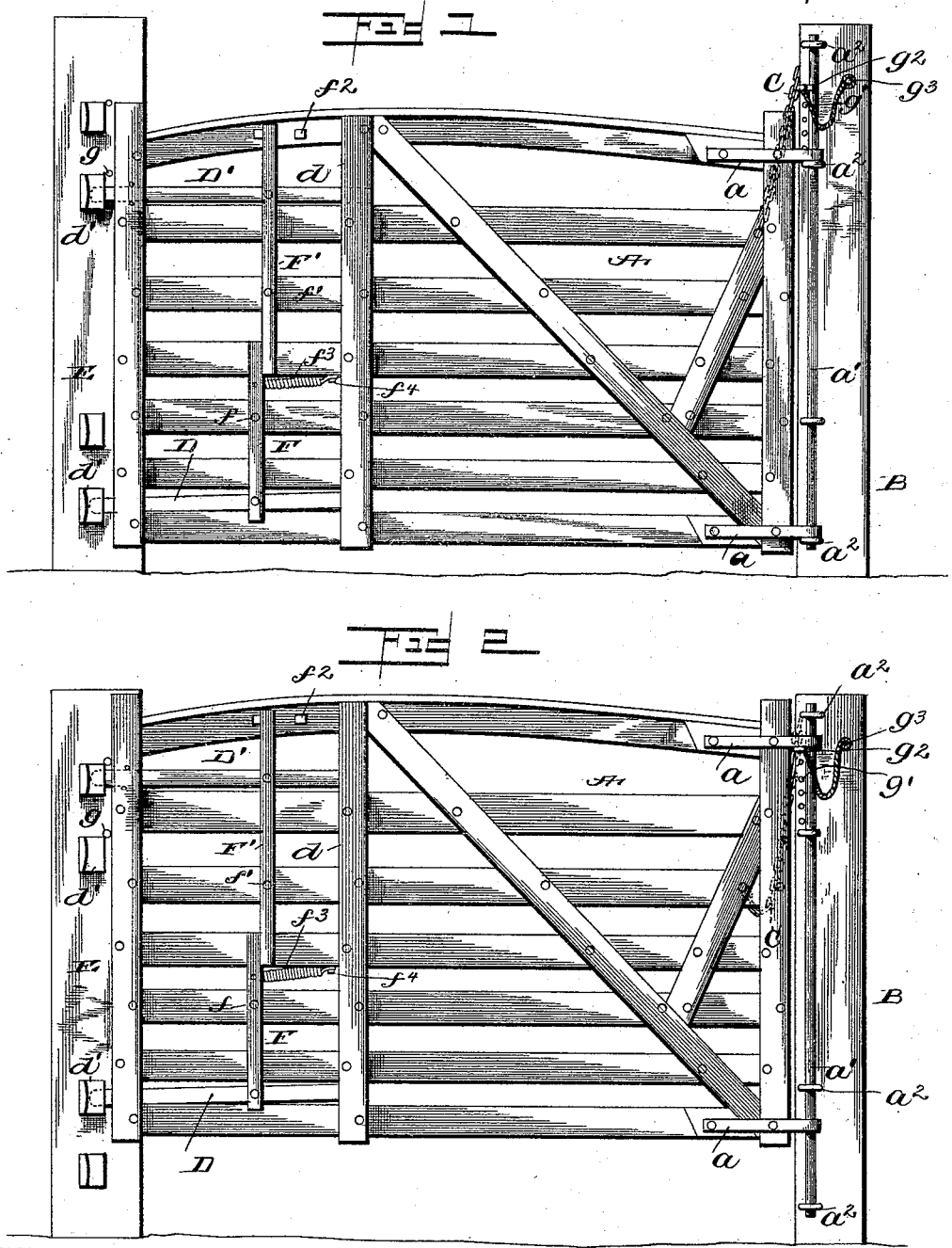

JAMES HIRAM TUDOR, OF LEXINGTON, ASSIGNOR OF ONE-HALF TO J. O. BROOKS, OF UNION CITY, KENTUCKY.

GATE.

SPECIFICATION forming part of Letters Patent No. 478,036, dated June 28, 1892.

Application filed November 9, 1891. Serial No. 411,325. (No model.)

*To all whom it may concern:*

Be it known that I, JAMES HIRAM TUDOR, of Lexington, in the county of Fayette and State of Kentucky, have invented certain new and useful Improvements in Gates; and I do hereby declare the following to be a full, clear, and exact description of the invention, such as will enable others skilled in the art to which it appertains to make and use the same.

This invention relates to a new and improved gate, and has reference more especially to swinging farm-gates wherein provision is made for the passage of small animals without the necessity of opening the gate.

The object of the invention is to provide improved means for holding the gate at an elevated point, so as to form an opening through which small animals—such as hogs, sheep, and the like—can pass while the gate is closed.

The invention comprises the details of construction, combination, and arrangement of parts, substantially as hereinafter fully set forth, and particularly pointed out in the claims.

In the accompanying drawings, Figure 1 is a view in side elevation of my improved gate, showing the same closed in its lower position. Fig. 2 is a similar view with the gate elevated.

Referring to the drawings, A designates the gate proper, and $a$ two hinge-plates, which are free to slide on a vertical hinging-rod $a'$, held by eyebolts $a^2$ to post B. To a brace-bar of gate A is connected one end of a chain C, the other (upper) end of which is secured to post B, near the upper end thereof. The object of this chain is to effect the raising of the gate in the opening thereof.

D D' designate two movable latch-rods guided between parallel brace-bars $d$ of gate A and designed to engage at their outer ends and be held by upper and lower hooked catches $d'$, projecting from a second post E. To the lower latch-rod D is pivoted the lower end of a vertical lever F, fulcrumed at $f$ to one of the panels of the gate, while to the upper latch-rod D' is pivoted a second lever F', also fulcrumed to one of the panels of the gate at $f'$. The lower end of this lever F' overlaps and bears against the upper end of lever F, while its upper end is extended between two stop-blocks $f^2$, secured to the topmost panel of the gate. A coil-spring $f^3$, secured at $f^4$ to one of the panels, is connected at its outer end to the lower lever F, near the upper end thereof. This spring serves to hold the latch-rods extended. By forcing the upper end of lever F' toward the hinged end of the gate the latch-rods will be withdrawn. These upper and lower latch-rods prevent the gate from being forced outward at either its upper portion by horses or cattle, or at its lower end by small animals, such as hogs, sheep, and the like. A short stud $g$ is projected from post E above the upper latch-rod D', and the same prevents the gate from being forced upward by hogs and the like rooting thereunder.

In post B is formed a series of holes $g'$ adjacent to the hinging-rod $a'$. Into any one of these holes is designed to be inserted a pin or bolt $g^2$, which is suspended from post B by a chain $g^3$. When the gate is opened to its full extent, the upper hinge-plate $a$ will be immediately above the topmost hole $g'$, (the gate in opening being elevated by chain C,) and by inserting said pin or bolt in said hole the gate may be prevented from descending, and after being closed will still be held elevated, the top hinge-plate bearing constantly upon said pin or bolt. Thus a space or opening is provided beneath the gate for the passage of hogs and the like. A space or opening of less height can be provided by inserting the pin or bolt into any one of the lower holes in the hinging-post. Two additional catches G G' are rigidly secured to post E for engagement therewith of the latch-rods when the gate is elevated, as last above described.

The advantages of my invention are apparent, and it will be specially observed that I have produced a gate having simple and inexpensive means whereby the gate cannot be forced out of place, and a space is provided for the free passage of small animals without having to open the gate.

I am aware that it is not new to provide a gate with a chain for automatically elevating the same while being opened, and also that gates have been held at different heights by pins inserted in the hinging-posts, and hence my invention is not designed, broadly, to cover these features.

I claim as my invention—

The herein-described improved gate, consisting of the stationary hinging-post having a series of holes or openings therein, the rod secured to said post, the gate having hinging eyes or plates movable on said rod, the chain connected to said gate and to said stationary hinging-post, the post having upper and lower catches projecting therefrom, the latch-rods for engaging said catches, and the pin suspended from said hinging-post and designed to be inserted in any one of said holes or openings and to support one of said hinging eyes or plates, substantially as set forth.

In testimony whereof I have signed this specification in the presence of two subscribing witnesses.

JAMES HIRAM TUDOR.

Witnesses:
J. B. GORHAM,
P. A. TATE.